Aug. 10, 1954

A. L. PRINCE

TESTING DEVICE

Filed Aug. 6, 1953

2,686,217

INVENTOR
ALFRED L. PRINCE.

BY Harold T. Stowell

ATTORNEY

Patented Aug. 10, 1954 2,686,217

UNITED STATES PATENT OFFICE 2,686,217

TESTING DEVICE

Alfred L. Prince, Providence, R. I., assignor to Research Corporation, New York, N. Y., a corporation of New York Application August 6, 1953, Serial No. 372,709

5 Claims. (Cl. 178—1)

This invention relates to an improved device for checking the operation of telegraphic tape decoding devices which are actuated upon sensing code perforations in telegraphic tape, and in particular to such devices for use on machines of type known as Teletypesetters.

The use of Teletypesetter equipment by news services which supply their subscribers with perforated tape which may be used to operate Linotype and Intertype machines, and the use of Teletypesetter equipment for setting editorial copy, classified advertising, market quotations and the like has become very general throughout the United States.

In newspaper work it is the general practice to use tapes having six perforations for each function which is known as the six hole tape. Tapes of this type provide 64 different combinations which are sufficient to take care of the entire alphabet, upper and lower case, plus other common and required operations.

The electromechanical control units for the perforated tape, like other mechanisms, are subject to wear and misadjustment. In the past if certain functions of the control unit were not performed properly it became necessary to provide the machinist with specially prepared tapes which could be used for checking out and adjusting the unit showing faulty operation.

It is an object of the present invention to provide a device adapted for use in checking out and adjusting sensing heads and control units employing telegraphic perforated tapes.

It is a further object to provide such a device which may be rapidly set to correspond to any function which may be coded on a particular tape.

Another object is to provide such a device that is easy to operate, simple as to its parts and relatively inexpensive to manufacture.

These and other objects and advantages of the invention are provided by the testing device for perforated tape sensing devices having a plurality of reciprocable sensing pins; the testing device comprising a head portion adapted to be positioned with its forward end adjacent the sensing pins of the tape sensing device, said head portion having a plurality of keyways extending longitudinally therein, keys mounted in the keyways for sliding movement between a forward position wherein a portion of the keys extend beyond the forward end of the head portion and a retracted position substantially within the head portion, and support means mounting the head portion for limited movement in a direction toward and away from the reciprocable sensing pins.

The invention will be more particularly described with reference to devices for use on control units employing six hole tape and in reference to the accompanying illustrations in which.

Figure 1:
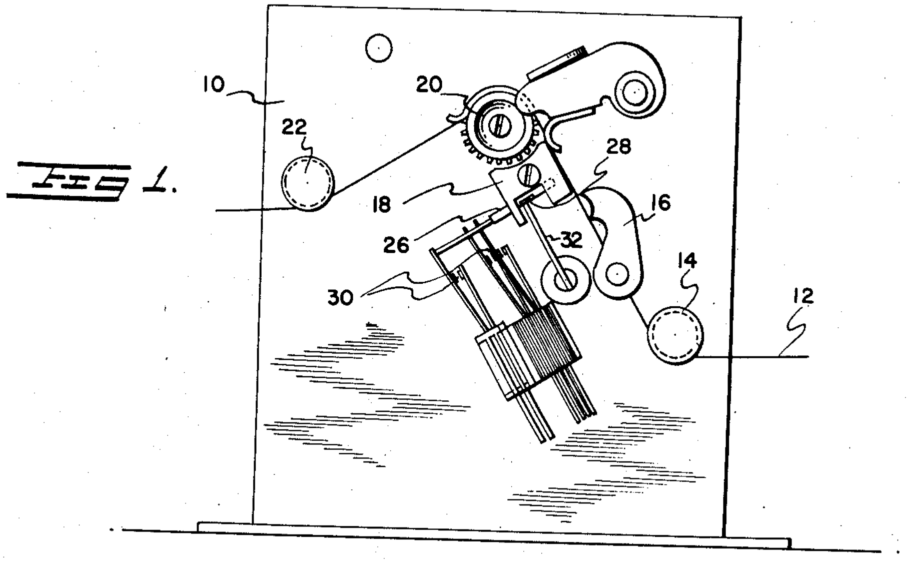
Fig. 1 is an elevational view of a typical perforated tape sensing element.
Figures 2, 3, 4, 5, 6:
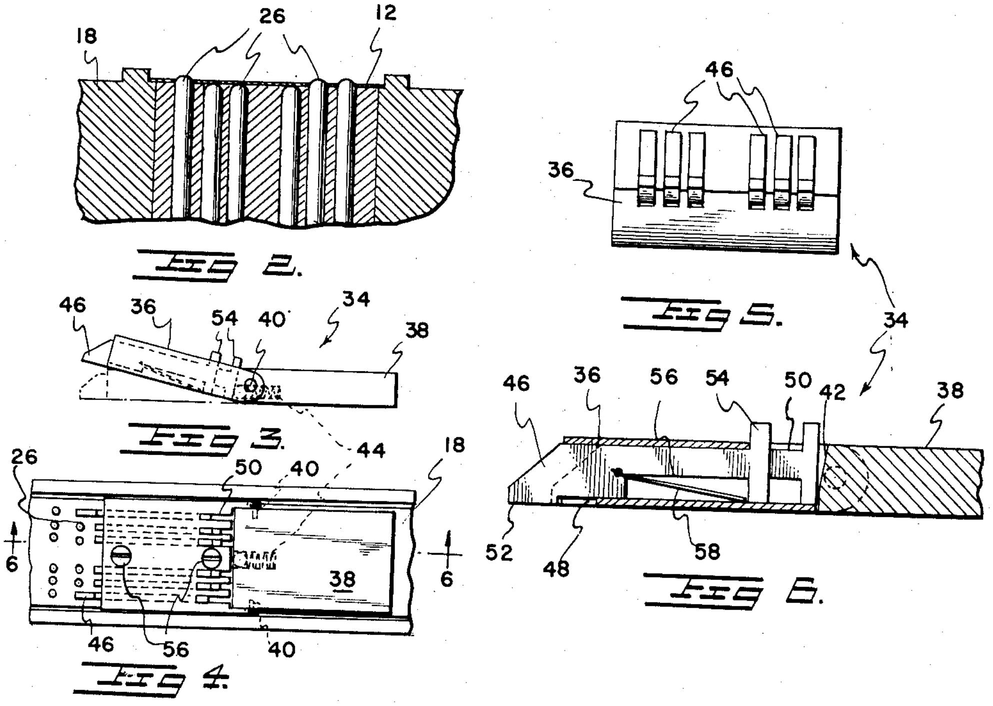
Fig. 2 is a fragmentary enlarged detailed view of the tape track and sensing pins of the device shown in Fig. 1.
Fig. 3 is a side view of a preferred embodiment of the testing device of the invention.
Fig. 4 is a top plan view of the device shown in Fig. 3 positioned on the tape track of a sensing device such as shown in Figs. 1 and 2.
Fig. 5 is a front end view of the device of the invention.
Fig. 6 is an enlarged fragmentary view on line 6—6 of Fig. 4.

With reference to the drawings and in particular to Figs. 1 and 2, 10 is the side plate of a typical six hole tape sensing unit. A perforated telegraphic tape 12 is fed from a supply roll or perforating unit, not shown in the drawings, under guide posts 14, under a tape guide arm 16, through a channel in the sensing head 18, over a driven sprocket wheel 20, and under a guide post 22 to a take-up reel, not shown in the drawings. The sprocket wheel 20 is rotated in step by step manner by a pawl arm generally designated 24 which is actuated by mechanisms as is well known in the art to advance the tape 12 one step for each cycle of operation of the sensing machine.

The sensing head carries a sensing element or pin 26 having a shouldered recess 28 for each unit of the code.

The individual pins are slidably disposed in the head 18 and are arranged to cooperate with individual sets of contact elements 30. In the instant disclosure six sets of contacts and sensing pins are provided.

Each sensing pin 26 has an elongated spring blade 32 which engages the shoulder recess 28 in the pin. The spring blades are pivoted in cooperative synchronism with drive mechanism which advances the tape.

As each row of code perforations is advanced to the sensing pins 26, the spring blade 32 is pivoted upwardly and the code perforations are detected or sensed by the pins which pass through the perforations in the tape. The travel of the code groups of pins sensing the perforations is sufficient to permit the corresponding contacts 30 to be closed. In this manner, code groups of impulses can be initiated in the individual signalling or control circuits, not shown in the drawings, connected to the sets of contacts 30 for operating, for example, a Linotype machine.

Referring to Figs. 3 through 6 there is shown the novel testing device generally designated 34, which is adapted to lie in the tape track of the sensing head 18 and control the movement of the sensing pins 26.

The testing device comprises a head portion 36 and a base portion 38 which are hinged together in end to end relationship by pins or screws 40.

In the preferred form of the invention the edge 42 of the base portion is beveled so that the normal relative movement between the head portion 36 and the base portion 38 is from a substantially rectilinear position as shown in Fig. 6 to a slightly angular position as shown in Figs. 3 and 5. The base member 38 is bored to receive a spring-urged detent 44, which detent lies in a plane below the pivot axis of pins 40, whereby the detent urges the base member and the head member into their angular relationship.

The head is provided with a number of keyways extending longitudinally therethrough. The number of the keyways provided in the head is determined by the maximum number of perforations in the tape to be sensed, six of which are shown in the illustrated form of the invention.

Each keyway is adapted to receive for reciprocating motion a key 46.

The keyways extend for a short distance through the bottom of the head portion at the leading edge as shown at 48 and through the top at the hinged end as shown at 50.

As more clearly shown in Fig. 6 of the drawings, each key 46 has a depending boss 52 at its forward end which projects into the corresponding slot 48. The boss 52 is of such length that it is flush with the bottom surface of the head portion 36.

The other end of each key has an upstanding boss 54 which projects through the opening 50 and extends a slight distance beyond the top of the head portion 36.

In order to reduce the cost of milling the keyways in the head portion and to facilitate the assembly of the keys 46 in the ways, the top and bottom of the head portion are manufactured as separation elements and secured together, for example, by bolts 56 after the keys have been positioned in the milled keyways.

The bosses 52 and 54 limit the longitudinal travel of the keys 46. Thus when a key is in the forward position, the forward edge of the boss 54 is in contact with the rearward edge of the slot 50 and the boss 52 extends beyond the forward edge of the head member. When a key is in its rearward position the rearward edge of the boss 52 is in contact with the forward edge of the slot 48.

In order to reduce inadvertent movement of the keys 46, each key is slotted as at 56 and provided with a leaf spring 58. One end of the spring 58 is secured to the key while the other end engages the bottom of its keyway and urges the key upwardly into snug engagement with the upper surface of its keyway.

In operation of the device of the invention, the base portion 38 is placed in the tape groove of the sensing head 18 (with the tape removed). The tester is longitudinally positioned in the groove so that when the head portion is pushed downwardly against the force of spring detent 44, the sensing pins 26 will engage the keys 46 which are in a forward position and miss the keys which are in a rearward position. The machinist may then proceed to check the function of the control unit in the following manner:

1. The spring detent is permitted to urge the head upwardly and away from the pins 26;

2. The machinist sets the desired function on the tester by sliding any combination of the keys into their forward position or rearward position;

3. The control mechanism is actuated by pressing the head 36 downwardly so that the keys which have been placed in the forward position engage their corresponding sensing pins;

4. The downward force on the head is released and the cycle repeated as often as necessary with the same code function or with different functions at the will of the machinist.

When the control unit has been repaired the tester 34 is removed from the head 18, the tape 12 replaced and normal functioning of the mechanism is resumed.

From the foregoing description it will be seen that the novel tester for control units of perforated tape recorders fully accomplishes the aims, objects and advantages of the invention.

While only one form of the Teletypesetter testing device has been shown in the drawings, it will be apparent to those skilled in the art that various modifications may be made in the tester without loss of its intended functions. For example, means may be provided for temporarily holding or clamping the base member to the tape track of the sensing head, and keys and keyways having shapes different from these shown in the drawings may be used.

I claim:

1. A testing device for perforated tape sensing devices having a plurality of reciprocable sensing pins; the testing device comprising a head portion adapted to be positioned with its forward end adjacent the sensing pins of the tape sensing device, said head portion having a plurality of keyways extending longitudinally therein, keys mounted in the keyways for sliding movement between a forward position wherein a portion of the keys extend beyond the forward end of the head portion and a retracted position substantially within the head portion, and support means mounting the head portion for limited movement in a direction toward and away from the reciprocable sensing pins.

2. A testing device as defined in claim 1 wherein each of said keys has an upstanding boss which projects beyond the top surface of the head portion.

3. A testing device as defined in claim 1 including spring means for each of the keys, said spring means acting between the bottom surface of the keyways and the lower edge of the keys whereby the keys are urged into snug engagement with the upper surfaces of the keyways.

4. A testing device for perforated tape sensing devices having a plurality of reciprocable sensing pins; the testing device comprising a head portion adapted to be positioned with its forward end adjacent the sensing pins of the tape sensing device, said head portion having a plurality of keyways extending longitudinally therein, keys mounted in the keyways for sliding movement between a forward position wherein a portion of the keys extend beyond the forward end of the head portion and a retracted position substantially within the head portion, a support member, means pivotally mounting the head portion to the support member for limited pivotal movement in a direction toward and away from the reciprocable sensing pins.

5. A testing device as defined in claim 4 including spring means acting between the head portion and the support member urging the support means away from the reciprocable sensing pins.

No references cited.